United States Patent [19]
Kojima et al.

[11] Patent Number: 4,932,013
[45] Date of Patent: Jun. 5, 1990

[54] APPARATUS FOR READING AN OPTICAL DISK WHICH CONTROLS TRACK JUMPING ACCURATELY AND STABLY

[75] Inventors: Kunio Kojima, Nara; Noriaki Sakamoto, Kyoto; Toshihisa Deguchi, Nara; Daiji Yamane, Yamatokohriyama, all of Japan

[73] Assignee: Sharp Kabushiki Kaisha, Osaka, Japan

[21] Appl. No.: 187,298

[22] Filed: Apr. 28, 1988

[30] Foreign Application Priority Data

Apr. 28, 1987 [JP] Japan .................. 62-107106

[51] Int. Cl.$^5$ .................. G11B 7/085; G11B 21/08
[52] U.S. Cl. .................. 369/32; 369/44.11; 360/78.06
[58] Field of Search .................. 358/342, 907; 369/43-47, 32; 250/201; 360/77.02, 78.04, 78.06

[56] References Cited

U.S. PATENT DOCUMENTS

| 4,057,832 | 11/1977 | Kappert | 358/342 |
| 4,764,860 | 8/1988 | Takao | 369/43 |
| 4,817,069 | 3/1989 | Shigemori | 369/43 X |

FOREIGN PATENT DOCUMENTS

3245000A1 6/1983 Fed. Rep. of Germany .
61-276134 6/1986 Japan .

*Primary Examiner*—Robert L. Richardson

[57] ABSTRACT

An apparatus for reading an optical disk having tracks extending tangentially includes a driving device for moving at least one light spot. A signal which indicates a deviation of the light spot from one of the tracks and a second circuit produces acceleration and deceleration signals. The driving device is controlled to accomplish a track jump of the light spot in accordance with the acceleration and deceleration signals. The second circuit produces the acceleration signal when a track jump is to be initiated and produces the deceleration signal when the ratio of the level of the tracking error signal to the peak value of the tracking error signal becomes equal to a predetermined value.

10 Claims, 6 Drawing Sheets

APPARATUS FOR READING AN OPTICAL DISK WHICH CONTROLS TRACK JUMPING ACCURATELY AND STABLY

BACKGROUND OF THE INVENTION

1. Field of the Invention

The present invention relates to an apparatus for reading an optical disk having tracks extending tangentially and in particular to an apparatus for reading an optical dish which can accurately and stably control a jump-like movement of a light spot.

2. Description of the Background of the Present Invention

An optical disk comprises a spiral track or concentric tracks in which information is recorded in optically. During the reading or recording process, at least one light spot is produced by a light source such as a semiconductor laser device which scans a desired track or track portion of the optical disk. Whan another track or track portion is to be scanned, the light spot is moved rapidly from one track or track portion to the other track or track portion in a radial direction by a driving device which includes a mirror. Such a jump-like movement of a light spot in a radial direction is referred as "a track jump". In order to accurately control a track jump, a so-called tracking error signal has been used.

An example of a system in which a tracking error signal is used is described in U.S. Pat. No. 4,057,832. In the system, as shown in FIG. 6, the reading/recording light spot A is sandwiched between two light spots $B_1$ and $B_2$ which are used for tracking servocontrol. Reflected beams of the two light spots $B_1$ and $B_2$ are detected by a suitable detector (not shown), and the difference between the two detected values is obtained as a tracking error signal 31 which is plotted in the graph of FIG. 3(a), having time as abscissa and level of the tracking signal as ordinate. In the graph, the tracking error signal 31 indicates a change of the intensity level between the two reflected beams of light spots $B_1$ and $B_2$ when the light spots A, $B_1$ and $B_2$ move in a radial direction with a constant velocity. When the light spot A is positioned at the center portion "a" of a track $Q_1$, the center portion "c" of an adjacent track $Q_2$, or the intermediate portion "b" between the two tracks, the level of the tracking error signal 1 is zero. From the tracking error signal 31 shown in FIG. 3(a), a track jump signal 32 (FIG. 3(b)) is produced. The track jump signal 32 is applied to a driving device for positioning the light spots, so that the driving device is accelerated or decelerated in accordance with the polarity of the track jump signal 32 when accomplishing the track jump. When the polarity of the tracking error signal 31 is positive, the track jump signal 32 functions as an acceleration signal, and when the polarity is negative, the track jump signal 32 functions as a deceleration signal. The deceleration signal is applied for the same period of time as the acceleration signal.

However, acceleration characteristics and deceleration characteristics are not always identical with each other in all kinds of driving devices usually employed in such systems. When such systems are used for conducting high-speed track jumps in order to reduce the period of time required for track jumps, the response of the driving device to the track jump signal 32 is delayed. Hence, a track jump cannot be conducted stably and accurately in such a conventional system wherein the polarity of the track jump signal 32 is switched at the instant when the level of the tracking error signal 1 becomes to zero (i.e., when the light spot A is positioned at the intermediate portion "b"). Such a location corresponding to the light spot A when the polarity of the track jump signal is switched is referred to as "a switch position".

In order to solve the above-mentioned problem of the prior art, the present inventions performs a track jump as follows: When a tracking error signal 43 (FIG. 4(a)) decreases to a predetermined level R, i.e., when the light spot A moves to a location "d" which is positioned slightly short of the intermediate location "b", the polarity of a track jump signal 4 (FIG. 4(b)) is switched to negative so that the driving device is decelerated. The abovementioned problem may be solved by this system. As shown in FIG. 5(a), however, the peak value of a tracking signal is not uniform but varies in accordance with detecting conditions such as the focus-servo condition, the shape of the tracks, and the efficiency of the detecting of a reflected light beam. In FIG. 5(a), three examples of tracking signals 51a, 51b and 51c are shown. According to the present invention, the polarity of a track jump signal is changed when the level of a tracking signal decreases to a predetermined level R. When the tracking signals 51a, 51b and 51c are compared with the predetermined level R, therefore, the switch position corresponding to each of the track jump signals 52a, 52b and 52c moves as indicated by references ea, eb and ec in FIG. 5(b), respectively. Consequently, the application times ta, tb and tc of track jump signals 52a, 52b and 52c fluctuate, resulting in an unstable track jump.

SUMMARY OF THE INVENTION

The apparatus for reading an optical disk of the present invention, which overcomes the above-discussed and numerous other disadvantages and deficiencies of the prior art, includes a driving device for moving at least one light spot; a first circuit for producing a tracking error signal which indicates a deviation of the light spot from one of the tracks; and a second circuit for producing acceleration and deceleration signals. The driving device is controlled to affect a track jump of the light spot in accordance with the acceleration and deceleration signals. The second circuit produces the acceleration signal when a track jump is to be initiated and produces the deceleration signal when the ratio of the level of the tracking error signal to the peak value of the tracking error signal is equal to a predetermined value.

In a preferred embodiment, the apparatus for reading an optical disk includes a holding circuit for holding a peak value of the tracking error signal; a third circuit for obtaining a ratio of the level of the tracking error signal to the peak value held by the holding circuit; and a comparing circuit for producing a timing signal having a state which changes when the ratio is equal to a predetermined value. The second circuit produces the acceleration signal when a track jump is to be initiated and produces the deceleration signal when receiving the timing signal.

In a preferred embodiment, the holding circuit holds a peak value of the tracking error signal while the light spot moves from one track or track portion to an adjacent track or track portion.

Thus, the present invention described above and below makes possible the objections of: (1) providing an apparatus for reading an optical disk which can accurately control a track jump in accordance with the acceleration and deceleration characteristics of the driving device for moving the light spot(s); and (2) providing an apparatus for reading an optical disk which can stably conduct a track jump operation even if the peak value of a tracking error signal fluctuates.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
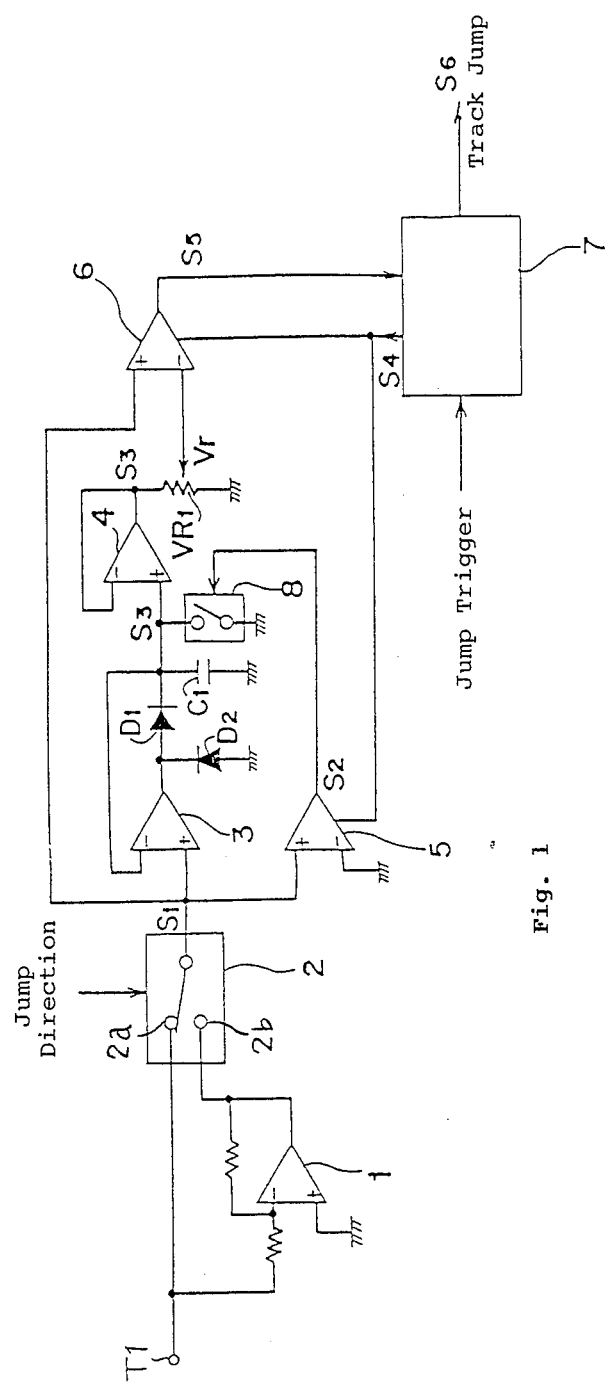
FIG. 1 is a circuit diagram illustrating an example of the present invention.
Figure 2:
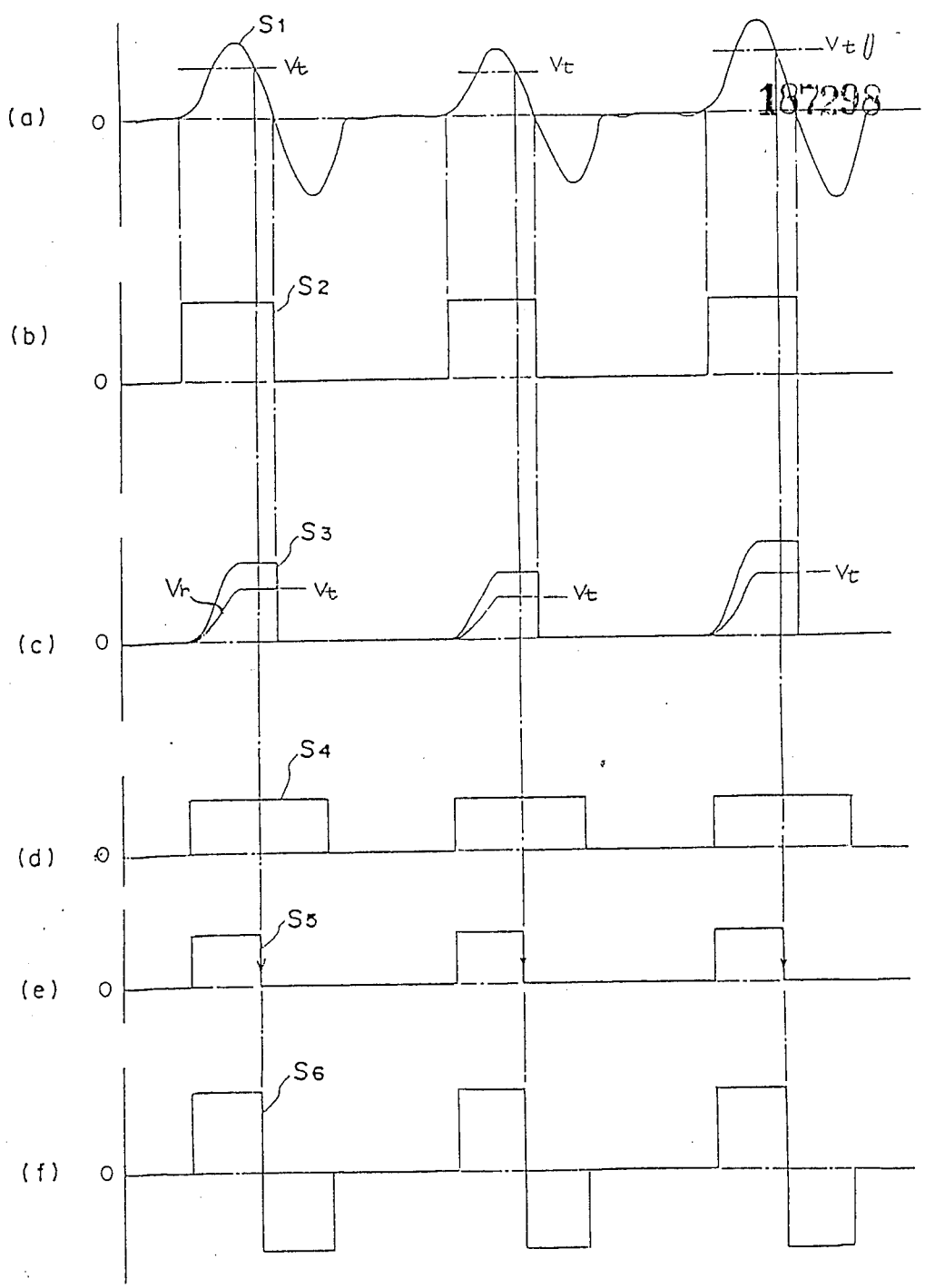
FIG. 2 shows waveforms of signals appearing in the circuit of FIG. 1.
Figure 3:
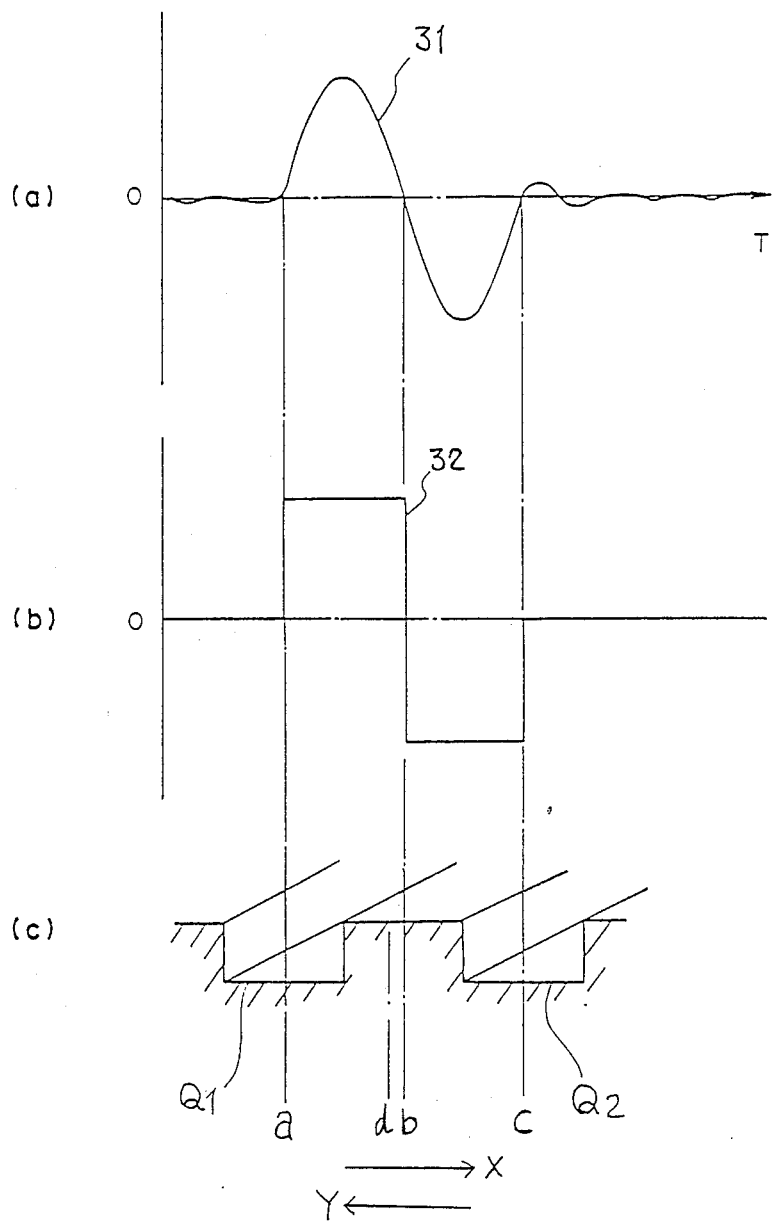
FIG. 3 shows waveforms of signals for illustrating a track jump in a conventional apparatus.
Figure 4:
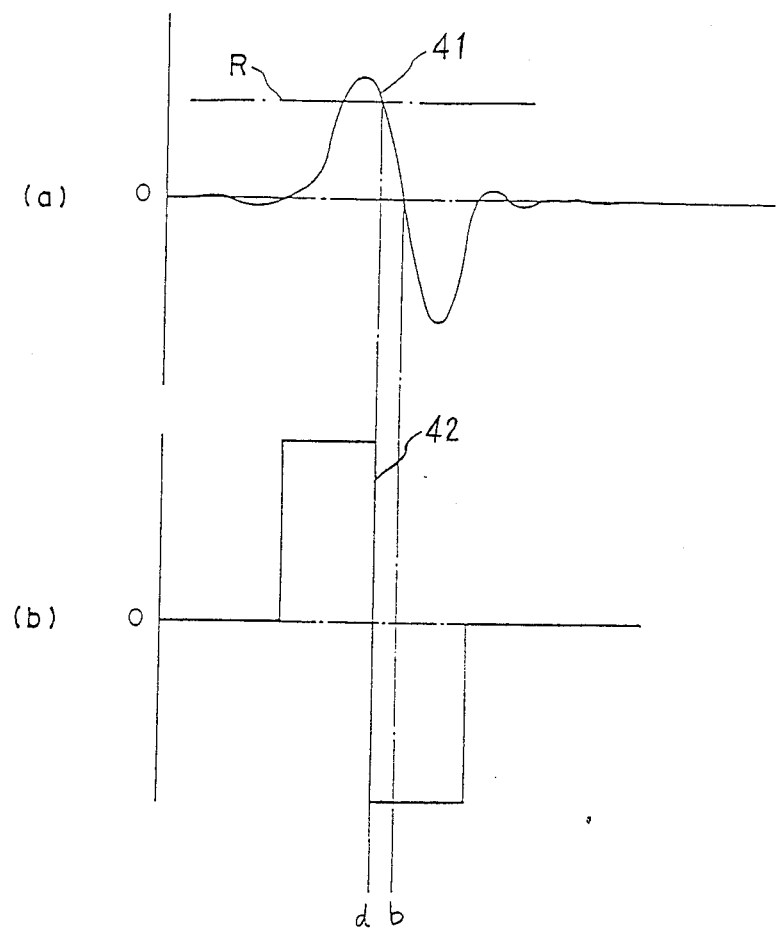
FIGS. 4 and 5 show waveforms of signals appearing in the present invention.
Figure 5:
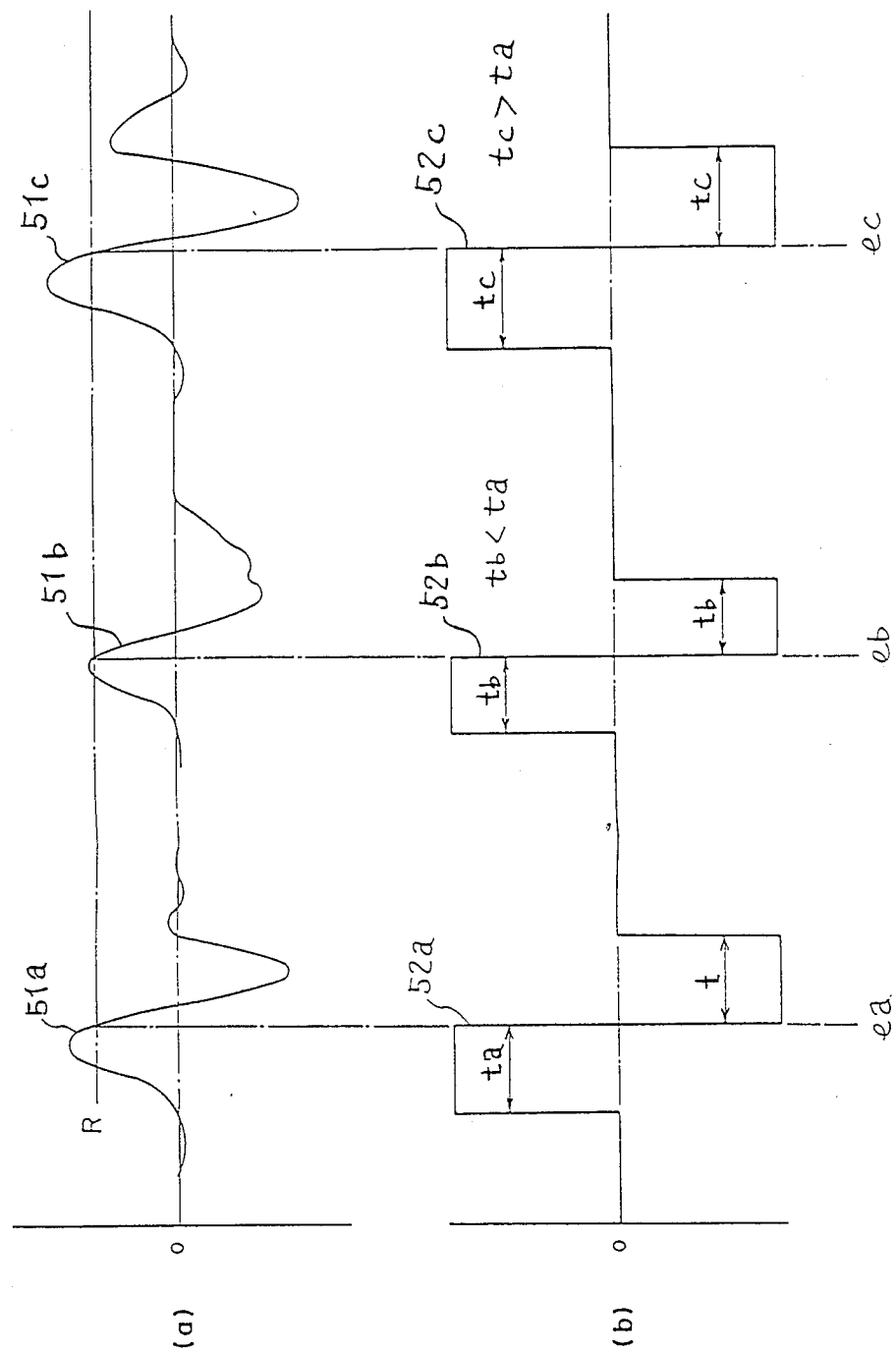
Figure 6:
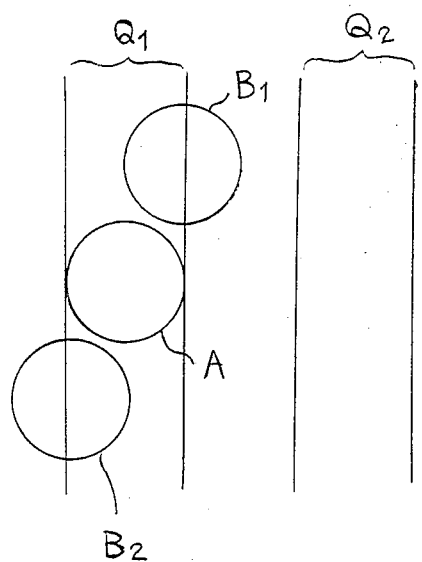
FIG. 6 illustrates a relation between light spots and tracks of an optical disk.

FIG. 1 is a circuit diagram illustrating an example of the present invention. When a track jump is to be conducted a jump trigger signal is supplied to a circuit 7 from a control circuit (not shown). The circuit 7 produces a pulse signal $S_4$ and a track jump signal $S_6$ having a positive polarity, and a counter (not shown) incorporated in circuit 7 starts up counting clock pulses. The track jump signal $S_6$ having a positive polarity is supplied to a driving device (not shown to start the track jump. In fact, the track jump signal $S_6$ having a positive polarity functions as an acceleration signal. The pulse signal $S_4$ is supplied to first and second comparators 5 and 6 (which will be described later) to control these comparators 5 and 6. A tracking error signal which is obtained from the light spots $B_1$ and $B_2$ in the same manner as the prior art described above is supplied to an input terminal $T_1$. The input terminal $T_1$ is connected to a terminal $2a$ of a first analog switch 2, and also connected to another terminal $2b$ of the analog switch 2 through an inverse amplifier 1. When the light spot A accompanied by the light spots $B_1$ and $B_2$ is to be moved in the direction X (FIG. 3(c)), the analog switch 2 is controlled to position itself at terminal $2a$ by a jump direction signal which is supplied from the control circuit. In contrast, the analog switch 2 is positioned at terminal $2b$ when the light spot A is to be moved in the direction Y. Hence, the relation between the polarity of the tracking error signal $S_1$ appearing at the output of the switch 2 and the position of the light spot A is fixed as shown in FIG. 2(a) irrespective of the direction (X or Y) of a track jump. The tracking error signal $S_1$ is supplied to a first operational amplifier 3 and the first and second comparators 5 and 6.

The operational amplifier 3, diodes $D_1$ and $D_2$, and a capacitor $C_1$ constitute a peak-hold circuit. The operational amplifier 3 compares the level of the tracking error signal $S_1$ supplied to the plus input with the potential of the capacitor $C_1$ *supplied to the minus input. As described below, the potential of the capacitor $C_1$* corresponds to the preceding peak value of the tracking error signal $S_1$. When the level of the tracking error signal $S_1$ is higher than the level of the minus input, the output level of the operational amplifier 3 corresponding to the level of the tracking error signal $S_1$ is applied to the capacitor $C_1$ through the diode $D_1$, thereby elevating the potential of the capacitor $C_1$ up to the level of the tracking error signal $S_1$. When the level of the tracking error signal $S_1$ is lower than the level of the minus input, the output of the operational amplifier 3 is kept at the ground level by the diode $D_2$ so that the potential of the capacitor $C_1$ is held at the peak value of the tracking error signal $S_1$.

The terminal voltage $S_3$ of the capacitor $C_1$ is applied to the plus input of a second operational amplifier 4 which functions as a voltage follower so that the terminal voltage $S_3$ is outputted as a peak-value signal $S_3$ (FIG. 2(c)). A variable resistor $VR_1$ to which the peak-value signal $S_3$ is applied provides a voltage signal $V_r$. After the level of the signal $S_3$ has reached the peak-value, the signal $V_r$ is held at the level $V_t$. The ratio of the level $V_t$ to the peak value of the signal $S_3$ has a predetermined value. The voltage signal $V_r$ is supplied to the minus input of the second operational amplifier 4. The ratio of the level $V_t$ to the peak value of the signal $S_3$ can be adequately selected in accordance with acceleration and deceleration characteristics of the driving device used in the apparatus.

The comparator 5 receives the tracking error signal $S_1$ from the first analog switch 2 to produce a timing signal $S_2$ for a half cycle of the tracking error signal $S_1$ as shown in FIG. 2(b). The timing signal $S_2$ controls a second analog switch 8 so that the capacitor $C_1$ discharges when the polarity of the tracking error signal $S_1$ is negative. Therefore, the period of detecting a peak-value of the tracking error signal $S_1$ by the peak hold circuit can be restricted during the period when the light spot A moves from track $Q_1$ to the adjacent track $Q_2$.

The voltage signal $V_r$ is applied to the minus input of the second comparator 6. When the level of the tracking error signal $S_1$ applied to the plus terminal is higher than that of the voltage signal $V_r$, the output (timing signal $S_5$) of the second comparator 6 is HIGH (FIG. 2(e)). As described below, the timing signal $S_5$ times the switching of the polarity of the track jump signal $S_6$. When the tracking error signal $S_1$ decreases to the level $V_t$ after passing the peak, the timing signal $S_5$ becomes LOW.

The timing signal $S_5$ is supplied to the track jump signal circuit 7. When the timing signal $S_5$ becomes LOW, the counter in the circuit 7 begins to count down. At the same time circuit 7 switches the polarity of the track jump signal $S_6$ to be negative so that the driving device begins to be decelerated. Namely, the track jump signal $S_6$ having a negative polarity functions as a deceleration signal. When the output of the counter in circuit 7 becomes zero, circuit 7 makes the pulse signal $S_4$ LOW and ceases the generation of the track jump signal $S_6$. The period of time during which the polarity of the track jump signal $S_6$ is positive (i.e., the driving device is accelerated) equals the period of time during which the polarity of the track jump signal $S_6$ is negative (i.e., the driving device is decelerated).

Two other examples of tracking error signals $S_1$ having different peak values are also shown in FIG. 2(a). As seen from FIG. 2(f), the timing for changing the polarity of the track jump signal $S_6$ is substantially the same in all cases irrespective of the peak value of the tracking error signal $S_1$. In other words, the periods of time during which the track jump signal $S_6$ is positive or negative are constant even if the peak value of the tracking error signal $S_1$ fluctuates. Therefore, a track jump can be conducted accurately and stably. As described above, the peak value of the tracking error signal $S_1$ held by the peakhold circuit is valid only while the light spot A moves from a track to an adjacent track. When the light spot A is controlled to jump over two or more tracks at one time, the number of tracks which the light spot A has jumped over can be easily recognized by counting the number of the timing signals $S_6$ because the timing signal $S_6$ is produced each time the light spot A moves from a track to an adjacent one.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for reading an optical disk having tracks extending tangentially using light spots, comprising:
   driving means for moving at least one light spot;
   first circuit means for producing a tracking error signal representing a deviation between a position of said light spot and one of said tracks; and
   second circuit means for producing an acceleration signal and a deceleration signal, said acceleration signal controlling said driving means to accelerate the movement of said light spot, said deceleration signal controlling said driving means to decelerate the movement of said light spot;
   said driving means accomplishing a track jump of said light spot in accordance with said acceleration and deceleration signals;
   said second circuit means producing said acceleration signal when said track jump is to be initiated and producing said deceleration signal when a ratio of a present level of said tracking error signal to a peak value of said tracking error signal becomes equal to a predetermined value.

2. An apparatus for reading an optical disk which has tracks extending tangentially using a light spot, comprising:
   driving means for moving at least one light spot;
   first circuit means for producing a tracking error signal representing a deviation between a position of said light spot and one of said tracks;
   second circuit means for producing acceleration and deceleration signals, said acceleration signal controlling said driving means to accelerate the movement of said light spot, said deceleration signal controlling said driving means to decelerate the movement of said light spot;
   said driving means accomplishing a track jump of said light spot in accordance with said acceleration and deceleration signals;
   holding means for holding a peak value of said tracking error signal;
   third circuit means for obtaining a ratio of a present level of said tracking error signal to said peak value of said tracking held by said holding means; and
   comparing means for producing a timing signal having a state which changes when said ratio becomes equal to a predetermined value;
   said second circuit means producing said acceleration signal when said track jump is to be initiated and producing said deceleration signal when receiving said timing signal.

3. The apparatus as claimed in claim 2, wherein said holding means holds a peak value of said tracking error signal while said light spot moves from one track or track portion to an adjacent track or track portion.

4. The apparatus as claimed in claim 2, wherein said holding means is a capacitor.

5. The apparatus as claimed in claim 2, further comprising:
   switching means for clearing said holding means when said tracking error signal has a negaitve polarity.

6. The apparatus as claimed in claim 4, further comprising:
   discharging means for discharging said capacitor when said tracking error signal has a negative polarity.

7. A method for controlling a jump operation in an apparatus for optically reading information from an optical disk, comprising the steps of:
   (a) producing a tracking error signal representing a deviation between a position of a light spot and a track on the optical disk;
   (b) moving the light spot to another track during a track operation;
   (c) accelerating the moving of the light spot when a track jump operation is initiated; and
   (d) decelerating the moving of the light spot when a ratio of a present level of the track error signal to a peak value of the tracking error signal becomes equal to a predetermined value.

8. The method as claimed in claim 7, further comprising the steps of:
   (e) storing the peak value of the tracking error signal;
   (f) comparing the stored peak value with the present level of the track error signal; and
   (g) storing the present level of the track error signal as the peak value of the tracking error signal when the present level is greater than the stored peak value.

9. The method as claimed in claim 8, wherein the peak value is stored when the light spot moves from one track or track portion to another track or track portion.

10. The method as claimed in claim 8, further comprising the step of:
    (h) clearing the peak value from storage when the tracking error signal has a negative polarity.

* * * * *